United States Patent
Cooke (10) Patent No.: US 9,205,520 B2
(45) Date of Patent: Dec. 8, 2015

(54) ONE-HIT TOOLING FOR FLUSH MOUNTED ROTATABLE CAPTIVE NUT

(75) Inventor: Andrew John Cooke, Galway (IE)

(73) Assignee: PEM Management, Inc., Wilmington, DE (US)

( * ) Notice: Subject to any disclaimer, the term of this patent is extended or adjusted under 35 U.S.C. 154(b) by 798 days.

(21) Appl. No.: 13/348,067

(22) Filed: Jan. 11, 2012

(65) Prior Publication Data

US 2012/0180301 A1    Jul. 19, 2012

Related U.S. Application Data (60) Provisional application No. 61/433,596, filed on Jan. 18, 2011.

(51) Int. Cl.
B23P 19/06        (2006.01)
F16B 37/06        (2006.01)

(52) U.S. Cl.
CPC ............. *B23P 19/062* (2013.01); *F16B 37/062* (2013.01); *Y10T 29/49908* (2015.01); *Y10T 29/5343* (2015.01)

(58) Field of Classification Search
CPC ........ B23P 11/005; B23P 15/06; B23P 15/46; B23P 15/50; B23P 19/04; B23P 19/10
USPC ................... 29/243.5, 243.517, 243.53, 255, 29/243.56, 252
See application file for complete search history.

(56) References Cited

U.S. PATENT DOCUMENTS

| | | | | |
|---|---|---|---|---|
| 4,610,072 | A | * | 9/1986 | Muller ............................ 29/512 |
| 5,027,503 | A | * | 7/1991 | Sawdon ........................ 29/798 |
| 5,267,497 | A | | 12/1993 | Arens |
| 5,367,759 | A | * | 11/1994 | Loew et al. ..................... 29/512 |
| 5,423,645 | A | | 6/1995 | Muller et al. |
| 6,092,270 | A | * | 7/2000 | Sawdon ....................... 29/243.5 |
| 6,532,665 | B2 | | 3/2003 | Parker |
| 6,612,007 | B1 | * | 9/2003 | Wade ........................... 29/243.5 |
| 6,684,479 | B2 | * | 2/2004 | Wang et al. .................... 29/521 |
| 6,742,235 | B2 | | 6/2004 | Blacket et al. |
| 6,932,044 | B1 | | 8/2005 | Fenech |
| 7,694,399 | B2 | | 4/2010 | Sawdon et al. |
| 7,752,879 | B2 | | 7/2010 | Diehl et al. |
| 2005/0229378 | A1 | * | 10/2005 | Dietrich et al. ................ 29/514 |
| 2008/0120825 | A1 | | 5/2008 | Shuart et al. |
| 2012/0180301 | A1 | * | 7/2012 | Cooke ............................. 29/505 |

* cited by examiner

*Primary Examiner* — Lee D Wilson
(74) *Attorney, Agent, or Firm* — Ryder, Lu, Mazzeo & Konleczny, LLC; Joseph M. Konleczny, Sr.; Gregory J. Gore (57) ABSTRACT

A two-stage punch accomplishes the two-step process of sheet deformation and nut flaring to attach the nut to the sheet in a single stroke of an assembly press. The punch comprises an outer cylindrical sleeve which captivates a resiliently biased center punch. When the punch is moved downward into contact with the sheet, an embossing ring on the sleeve deforms the sheet material around an aperture in the sheet. When the punch is moved farther downward, a pointed end of the center punch extends beyond the embossing ring and into forcible contact with the nut. The nut is thereby flared capturing the sheet between flared edges of the nut and a nut flange.

4 Claims, 7 Drawing Sheets

ONE-HIT TOOLING FOR FLUSH MOUNTED ROTATABLE CAPTIVE NUT

RELATED APPLICATION

This patent application is a non-provisional of provisional patent application Ser. No. 61/433,596 entitled "One-Hit Tooling for Flush Mounted Rotatable Captive Nut" filed on Jan. 18, 2011, priority from which is hereby claimed.

FIELD OF THE INVENTION

The present invention relates to fasteners which are captivated in a sheet of material yet are free to rotate. More specifically, it relates to a flush mounted captive nut for sheet materials of greater hardness.

BACKGROUND OF THE INVENTION

There has been known a need in the industry for a nut that is captive within a sheet yet freely rotatable so it can be press-inserted without the need for additional structures or assembly. Examples in the prior art are disclosed in U.S. Pat. No. 3,374,382 issued to Bentrim and U.S. Pat. No. 5,842,894 issued to Mehlberg. These documents disclose a rotatable captive nut that is mounted flush with the backside of the sheet and which relies upon the deformation of the sheet for captivation by the nut as it is pressed in. Inherently, these nuts require the attachment sheet to be of relatively soft material so that features on the nut will displace sheet material into an undercut groove which captivates the nut to the sheet. In order to meet the needs in the art for a rotatable captive nut for sheets of greater hardness as disclosed in U.S. Pat. No. 6,932,044 issued to Fenech, additional structures such as a washer on the backside of the sheet are employed. However, this negates the desired flush mounting with the backside of the sheet.

Captive nuts which are pressed into sheets of relatively hard material that provide flush but rigid attachment require a two-step pressing process in which the sheet is first deformed into a generally dome-shape or frustoconical-shape surrounding the sheet hole. In a separate second step, a tubular shank extending from the backside of the nut is inserted through the hole and flared over the sheet. The flared-over-section of the end of the nut occupies the void in the backside of the sheet formed by the panel deformation of the first step thus providing flush attachment. Examples of such methodology are disclosed in U.S. Pat. No. 5,423,645 issued to Muller et al. However, in these cases, the nut is not rotatable and the double pressing requirement makes the assembly process expensive.

It is therefore an object of the present invention to provide a rotatable nut attachment to a sheet of greater hardness which is characterized in that the nut is either flush or sub-flush with the backside of the sheet. It is a further object of the invention to achieve an insertion process for such a fastener assembly which is a "one-hit" installation using a punch press.

SUMMARY OF THE INVENTION

These objects of the invention have been achieved by devising a nut and panel configuration which allows the installation of the nut into a panel or sheet of harder material which also permits the nut to freely rotate while providing a flush or slightly sub-flush mounting to the planar backside of the attached material. The use of these structures is enhanced by the creation of special tooling which permits the heretofore two-step process of sheet deformation and nut flaring to be accomplished in a one-hit stroke of the assembly press.

More specifically, the Applicant has invented a two-stage punch in a fastener press for installing a nut into a sheet of host material comprising a cylindrical sleeve having an internal axial bore, said sleeve having an axially extending embossing ring projecting from a first end of the sleeve. A cylindrical coil spring is located within the sleeve and operative at a first end thereof again an internal inward facing flange of the sleeve. A center punch having a shank portion which is received within the spring and the sleeve includes a radially extending collar which is closely slidable within the sleeve bore. The collar includes a surface which bears against a second end of the spring. The center punch has a working pointed end and an opposing driving end adapted for affixation to a ram of the press. The punch includes means for captivating the center punch in the sleeve such that the sleeve is resiliently biased away from the driving end of the center punch which allow the sleeve to be moveable between extended and retraced positions relative to the punch. The embossing ring extends axially beyond the end of the center punch when the sleeve is in the extended position. The sleeve and center punch are operative such that the pointed end extends axially beyond the embossing ring when the sleeve is in the retracted position due to the compression of the spring by application of force applied to the driving end of the center punch. This force is counteracted by the impingement of the embossing ring against the host material which retracts the sleeve. The pointed end of the center punch is adapted to bear against the nut so that the nut is forcibly attached to the sheet of host material by deformation of the nut which captures the sheet between flared edges of the nut and a nut flange.

The above-described two-stage punch is employed in a method for affixing the nut to the sheet of host material by installing a driving end of the punch into the vertically moveable ram of the press which has an anvil located directly below the ram. Next, the punch is aligned with an aperture in the sheet of host material which is axially aligned with the nut which resides within a cavity of an anvil of the press located on the side of the sheet opposite the punch. The punch is then moved downward into contact with the sheet embossing the sheet material around the aperture by an embossing ring at the end of the resiliently biased retractable sleeve of the punch. The punch is then moved farther downward until the pointed end of the center punch within the sleeve of the punch extends beyond the embossing ring and into forcible contact with the nut. The nut is thereby flared capturing the sheet between flared edges of the nut and a nut flange.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DESCRIPTION OF THE PREFERRED EMBODIMENT

Figure 1:
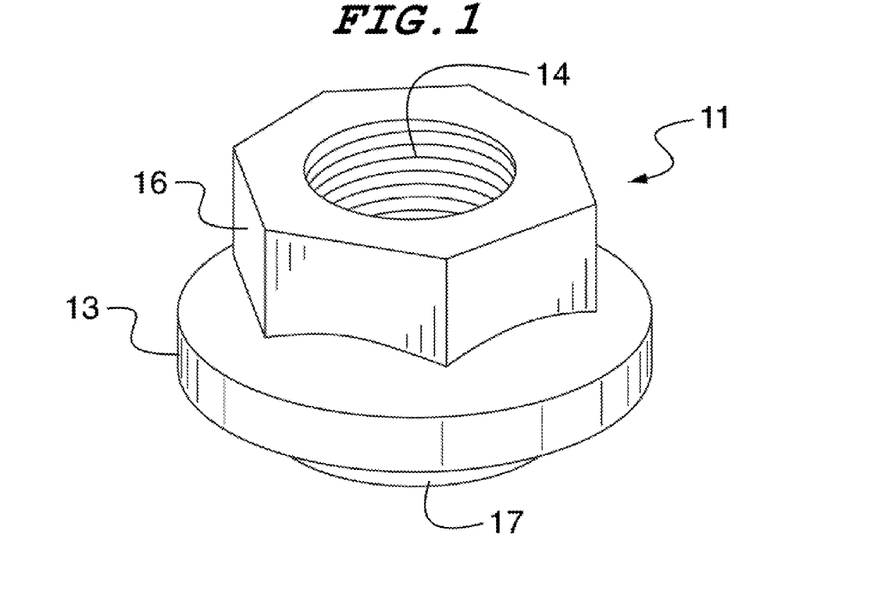
FIG. 1 is a top front isometric view of the nut fastener of the present invention.
Figure 2:
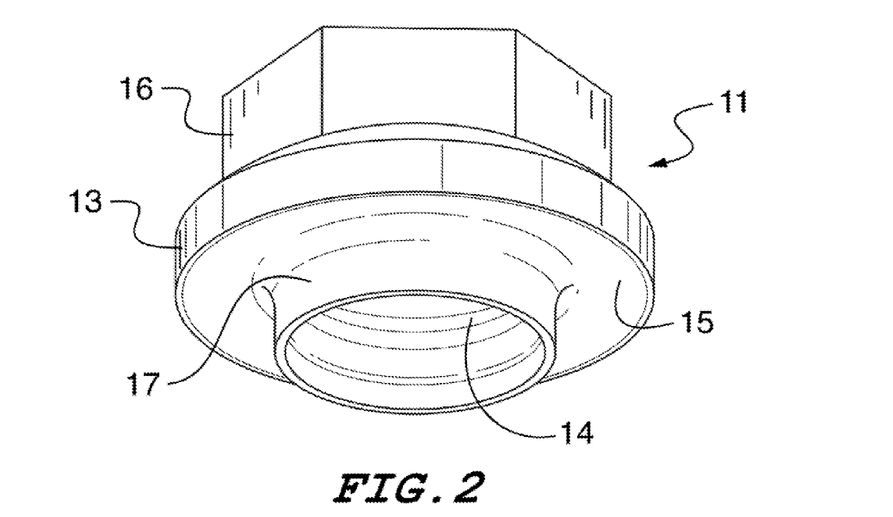
FIG. 2 is a bottom left isometric view of the nut shown in FIG. 1

Referring now to FIGS. 1 and 2, the nut employed in achieving the objects of the invention is shown. The nut 11 includes a flange 13 which has a conical depression or well 15 in its underside that extends from an outer wall tapering inwardly and upwardly to the top of a downwardly extending tubular shank 17. The nut includes an ordinary threaded throughbore 14 and wrenchable flats 16 for tool engagement to rotate the nut after installation.

Figure 3:
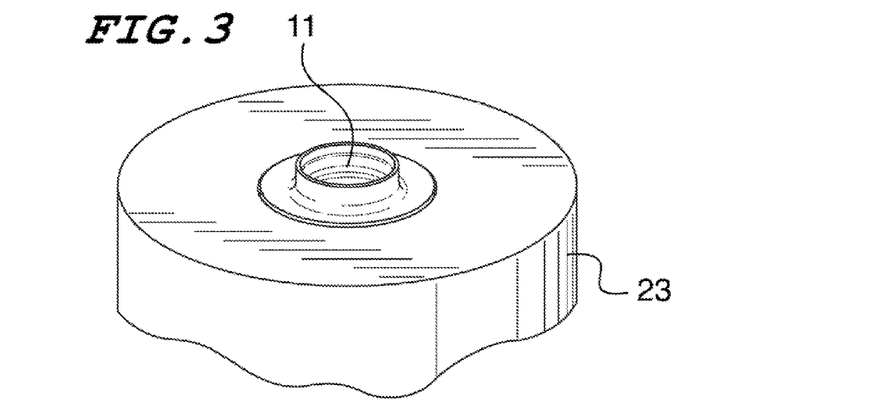
FIG. 3 is a bottom front isometric view of the underside of the punch tooling of the invention from the underside.

Referring now to FIG. 3, the nut 11 of FIGS. 1 and 2 is shown installed seated upside down (head facing down) in a central cup of the installation tooling anvil 23.

Figure 4:
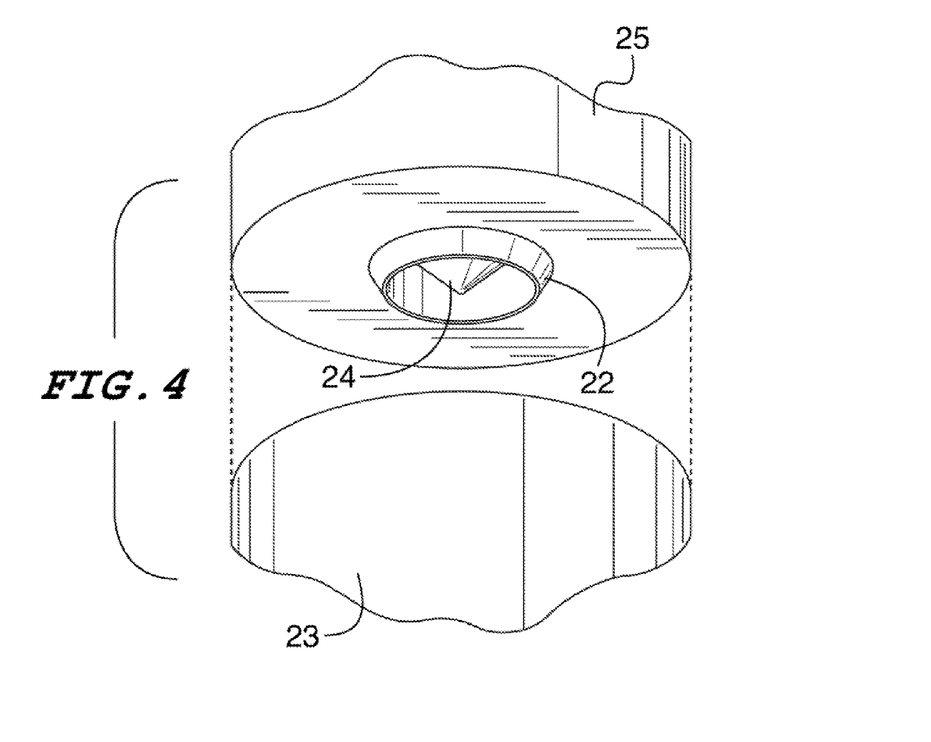
FIG. 4 is a top front isometric view of the tooling anvil with the nut of FIGS. 1 and 2 seated within a central well in the tooling anvil.

FIG. 4 shows the bottom side of the reciprocating press ram 25 which shows the operative features of the punch including an outer sleeve having a downwardly extending circumferential embossing ring 22. The sleeve is slidable about a center punch 24 which has a pointed cone-shaped end.

Referring now to FIG. 5, the nut 11 and anvil 23 depicted in FIGS. 1-4 are shown in cross-section with punch 26. In this Figure are depicted five illustrations representing the individual installation steps of the invention which are labeled here as steps 5a through 5e. 5a shows a sheet 12 having a simple round hole therein adapted dimensionally to receive the fastener shank. FIG. 5b shows the nut seated head-down in a central cup-like cavity of the tooling anvil as shown in FIG. 3. FIGS. 5c through 5e show the sheet of 5a placed over the anvil and nut seated as shown in 5b in alignment with a two-stage punch which sequentially achieves the attachment of the sheet and the nut with a single stroke of the punch ram.

Figure 6:
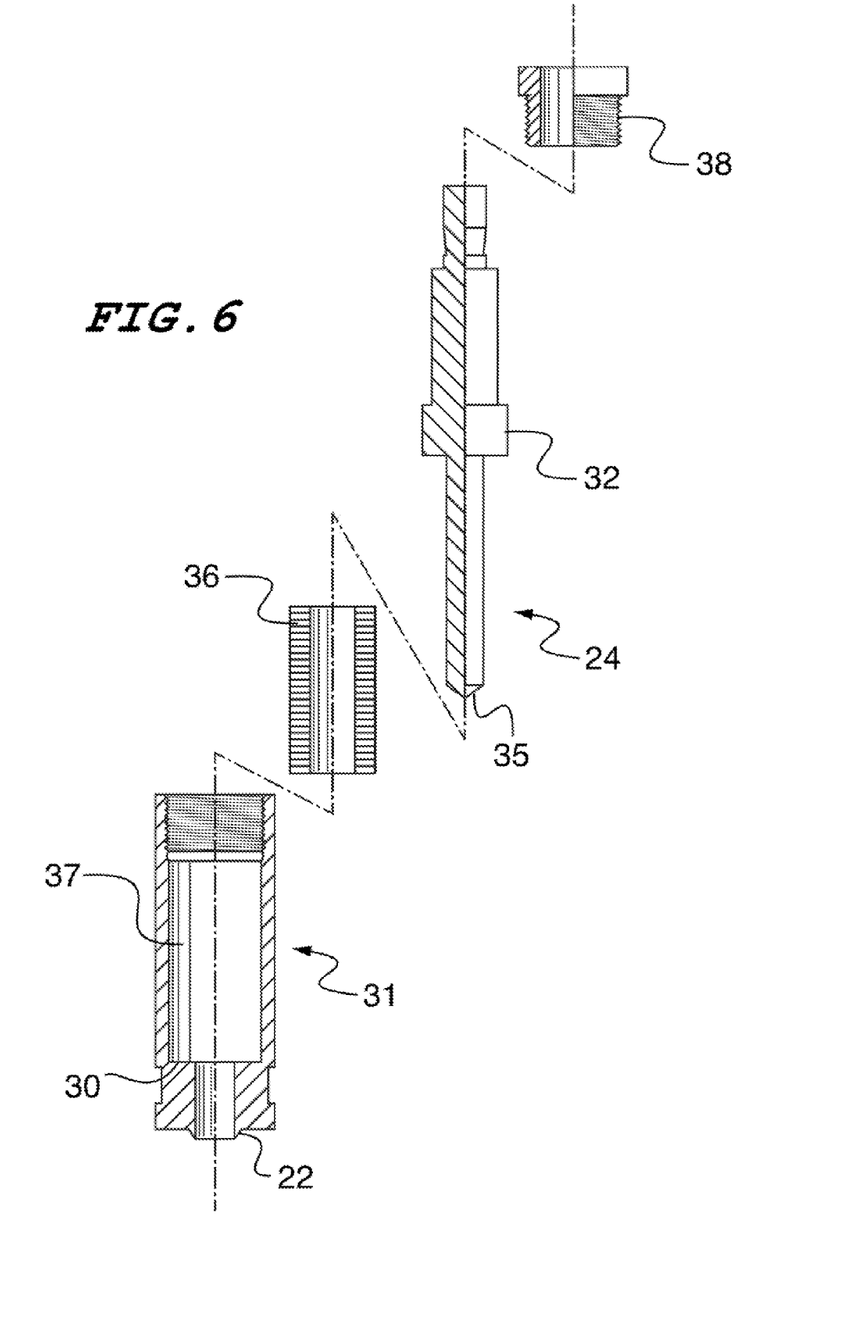
FIG. 6 is a cross-section assembly view of the punch components.

FIG. 6 is an assembly drawing showing the components of the two stage punch. The installation tool includes two reciprocal elements. An outer sleeve 31 that includes an embossing ring 22 which works on the sheet and a center punch 24 which incorporates a conical pointed end 35 that works on the nut. The outer sleeve 31 is slidable about a radially extending collar 32 of the center punch that is received within a close-fitting cylindrical bore 37 of the sleeve. The driving end of the center punch is fixed to the press ram. By spring means 36, the center punch collar 32 resiliently biases the outer sleeve 31 downwardly. The spring 36 is operative between the center punch collar 32 at the top and an inner flange 30 at the base of the sleeve bore 37 which houses both the center punch 24 and the spring 36. End cap 38 is threadably secured to the open end of the sleeve bore to capture the spring 36 and center punch 24 inside the sleeve bore. This punch assembly is held within a reciprocating ram 25 of a press as shown in FIG. 4.

Referring again to FIG. 5, in their assembled free state, the operative elements of the first and second stage punch components are dimensioned such that the sleeve embossment ring engages the sheet material prior to the center punch contacting the shank of the nut as the press ram descends. Then, as shown in FIG. 5d, when the punch is lowered by the press, the circumferential ridge on the outer punch presses downward on the sheet so that the sheet is embossed and the edges of the hole are driven into the frustoconical well in the base of the nut flange. Further pressing as shown in FIG. 5e causes the sheet to bottom out against the nut flange held there by compression of the spring while the center punch continues to move farther downward imparting an outward flaring of the nut shank. The flared end of the shank captures the sheet against the flange while occupying the void of the embossed depression around the installation hole.

Figure 5A:
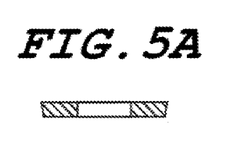
FIG. 5 is a sequential front elevation partial cross-section view representing five steps in the installation process showing operation of the two-stage tooling punch.
Figure 5B:
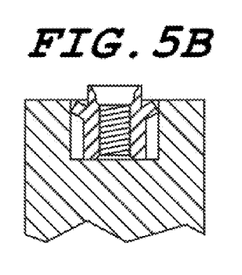
Figure 5C:
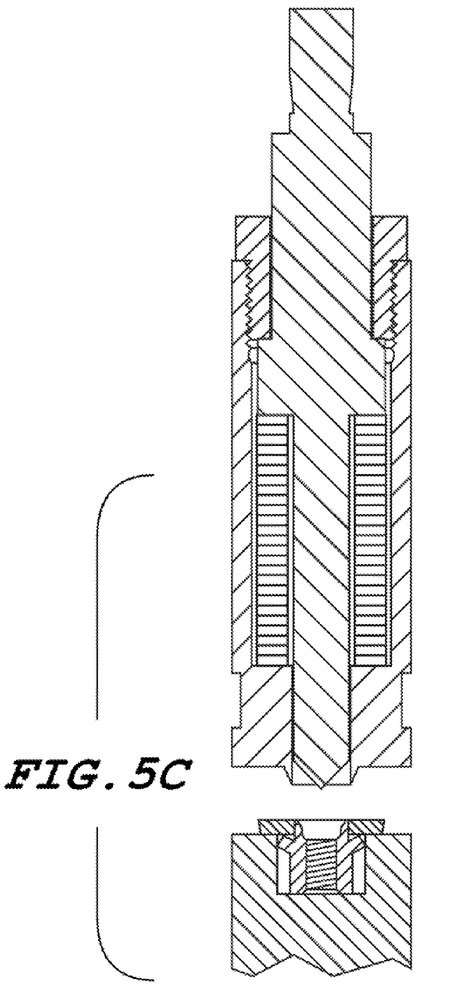
Figure 5D:
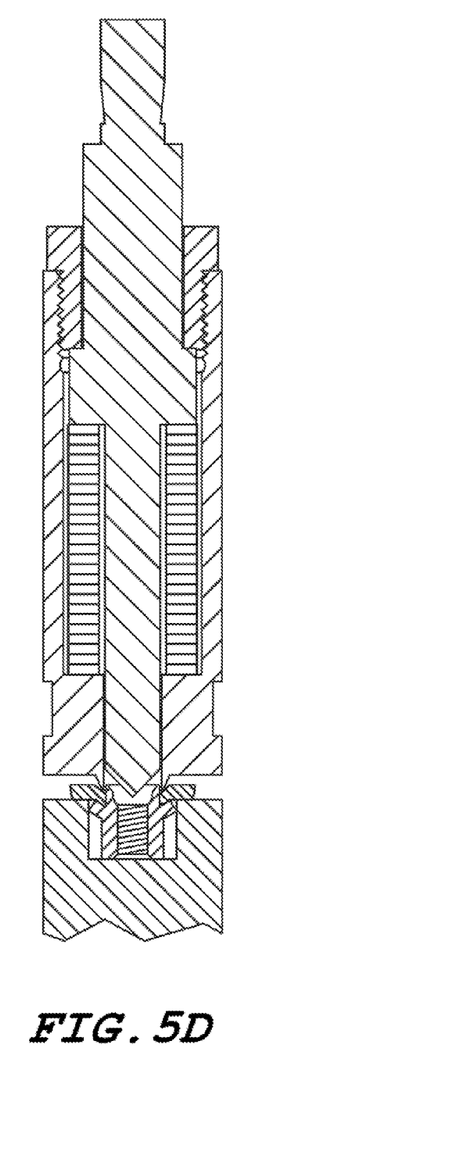
Figure 5E:
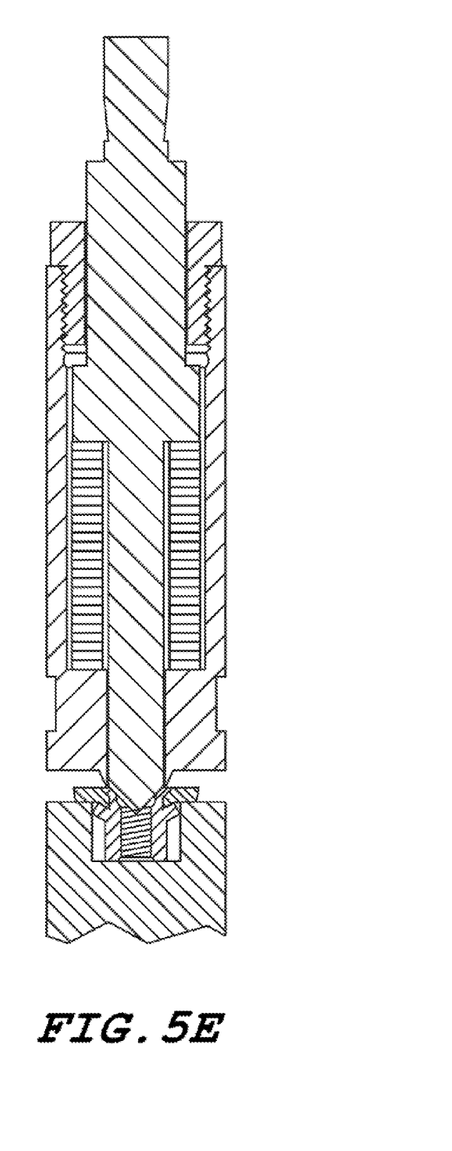
Figure 7A:
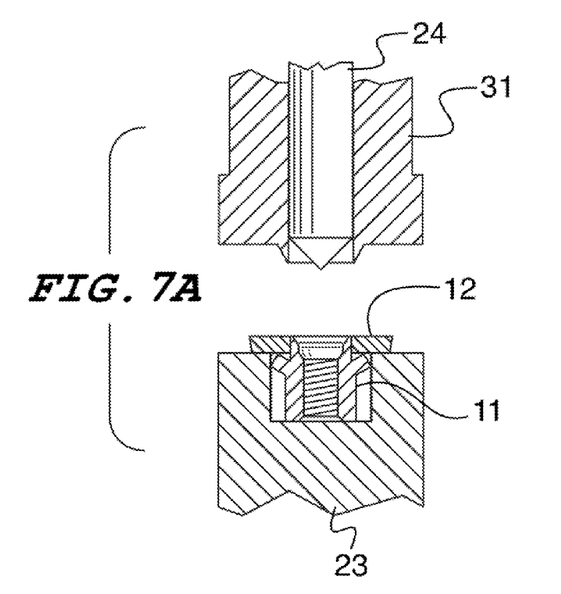
FIG. 7 is front elevation cross-section enlarged view of three steps of the installation process depicted in FIG. 5.
Figure 7B:
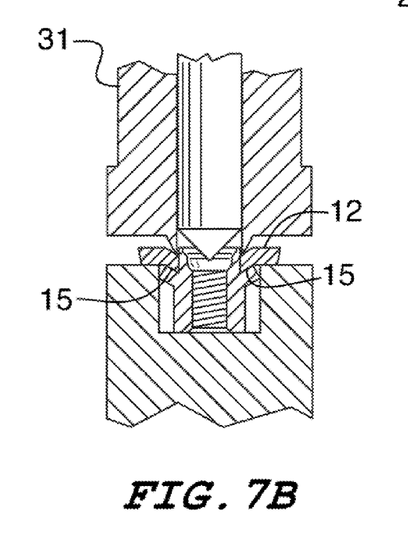
Figure 7C:
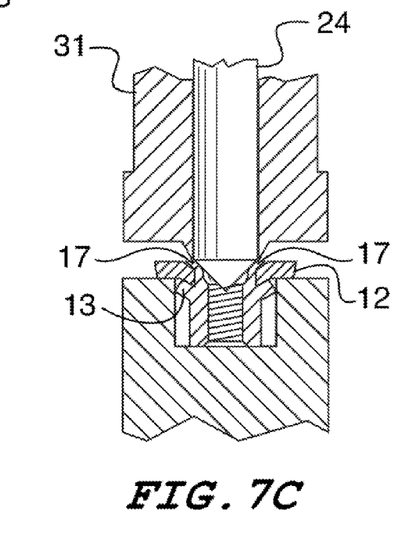
Figure 8:
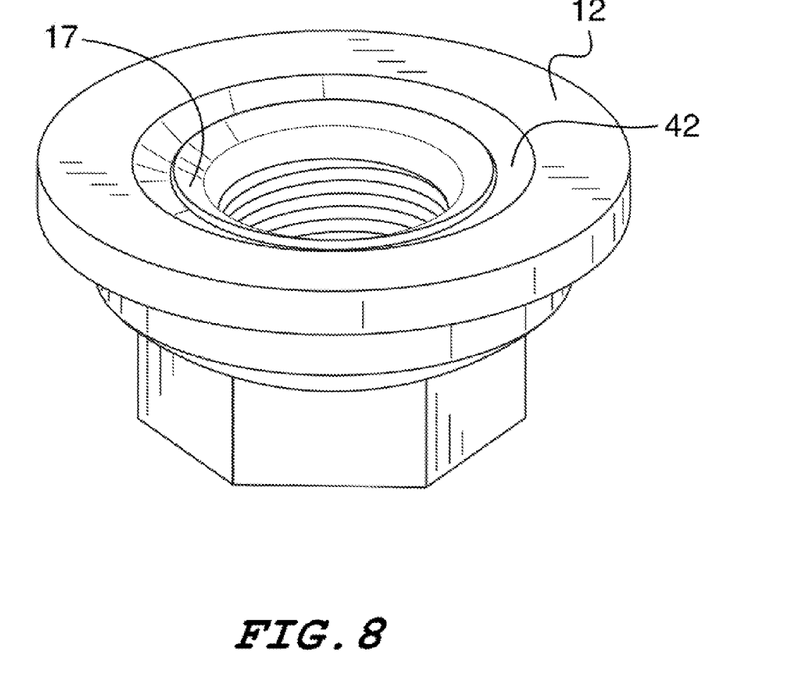
FIG. 8 is a top front isometric view showing the resulting flush attachment achieved by the inventive tooling and process.

Referring now to FIG. 7, a closer view of the above-described installation process regarding FIGS. 5c, 5d and 5e is shown in corresponding FIGS. 7a, 7b and 7c. The installation process begins by the alignment of the components of the punch sleeve 31 and center punch 24 with the sheet 12 and nut 11 which is seated in a cavity of anvil 23. As shown in 7b of this sequence, the spring-biased outer sleeve 31 first embosses the sheet material around the outside edges of the sheet hole by embossing ring 22, depressing the sheet 12 downward into the flange well. As shown in FIG. 7c, as downward pressing force increases the spring force of the outer sleeve is overcome and the sheet embossing bottoms out. The center punch 24 then moves farther downward independent of the outer sleeve 31 flaring the edges around the end of the fastener shank outwardly to capture the sheet 12 between the flared edges of the nut and the nut flange 13. As shown in FIG. 8, the length of the shank and its flaring 17 is such that the end of the nut resides wholly within the embossment void 42 and does not extend beyond the plane of the surrounding sheet material 12 thus providing flush attachment.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A two-stage punch in a fastener press for installing a nut into a sheet of host material, comprising:
   a cylindrical sleeve having an internal axial bore, said sleeve having an axially extending embossing ring projecting from a first end;
   a spring located within said sleeve and operative at a first end thereof against an internal inward facing flange of said sleeve;
   a center punch having a shank portion which is received within said spring and said sleeve which includes a radially extending collar closely slidable within said sleeve bore, said collar including a surface which bears against a second end of said spring, said center punch further described as having a working pointed end and an opposing driving end adapted for affixation to a ram of a press;
   means for captivating said center punch in said sleeve such that said sleeve is resiliently biased away from said driving end of said center punch and said sleeve is moveable between extended and retracted positions relative to said punch; and wherein said embossing ring extends axially beyond the pointed end of said center punch when said sleeve is in the extended position, said sleeve and center punch being operative such that said pointed end extends axially beyond said embossing ring when said sleeve is in the retracted position due to the compression of said spring by the application of force applied to said driving end of said center punch which is counteracted by the impingement of the embossing ring against the host material.

2. The punch of claim 1 wherein said pointed end is adapted to bear against a nut so that the nut is forcibly attached to said sheet of host material by deformation of the nut which captures the sheet between flared edges of the nut and the nut flange.

3. The punch of claim 1 wherein said means for captivating said center punch is an end cap which threadably engages an internally threaded portion of said sleeve at a second end of said sleeve opposite said first end.

4. The punch of claim 3 wherein said spring is a cylindrical coil spring.

* * * * *